United States Patent
Teschner et al.

(10) Patent No.: US 6,679,548 B2
(45) Date of Patent: *Jan. 20, 2004

(54) TRANSPARENT ROOF MODULE FOR A MOTOR VEHICLE ROOF

(75) Inventors: Helmut Teschner, Finning (DE); Werner Pätz, Hofstetten (DE); Reinhard Wecker, Eichenau (DE)

(73) Assignee: Webasto Karosseriesysteme GmbH, Stockdorf (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 169 days.

(21) Appl. No.: 09/428,472

(22) Filed: Oct. 28, 1999

(65) Prior Publication Data

US 2002/0008410 A1 Jan. 24, 2002

(30) Foreign Application Priority Data

Oct. 29, 1998 (DE) .......................... 198 49 838

(51) Int. Cl.⁷ ................................. B60J 7/043

(52) U.S. Cl. ..................................... 296/211

(58) Field of Search .................. 296/211, 215, 296/216.02, 216.03, 220.01

(56) References Cited

U.S. PATENT DOCUMENTS

| 4,217,391 A | * 8/1980 | Kaltz ........................ 296/215 |
| 4,219,230 A | * 8/1980 | Lapine ...................... 296/215 |
| 4,892,351 A | * 1/1990 | Ono et al. .................. 296/213 |
| 5,167,986 A | * 12/1992 | Gordon ...................... 427/166 |
| 5,228,925 A | * 7/1993 | Nath et al. ................. 296/215 |
| 5,797,999 A | * 8/1998 | Sannomiya et al. .. 136/258 PC |
| 5,815,997 A | * 10/1998 | Cornils et al. ............... 52/208 |
| 6,010,775 A | * 1/2000 | Kraemling et al. ......... 296/215 |

FOREIGN PATENT DOCUMENTS

| DE | 3713853 | * 10/1987 | ................ 296/211 |
| DE | 3713854 | * 10/1987 | ................ 296/211 |
| DE | 37 25 053 | 2/1989 | |
| DE | 196 30 813 | 3/1997 | |
| JP | 63419 | * 3/1989 | ................ 296/211 |
| JP | 1215621 | * 8/1989 | ................ 296/211 |

* cited by examiner

Primary Examiner—Dennis H. Pedder
(74) Attorney, Agent, or Firm—Nixon Peabody LLP; David S. Safran

(57) ABSTRACT

A transparent roof module for a motor vehicle roof where the transparent roof module includes a transparent pane for covering a roof opening, the cover including a nonviewing area and a viewing area through which objects are viewable through the cover, a transmission reducing layer provided on the viewing area of the transparent pane for reducing transmission of at least one of infrared and visible spectral range through the viewing area and solar cells provided at the nonviewing area of the transparent pane.

12 Claims, 1 Drawing Sheet

TRANSPARENT ROOF MODULE FOR A MOTOR VEHICLE ROOF

BACKGROUND OF THE INVENTION

1. Field of the Invention

The invention relates to a transparent roof module for a motor vehicle roof. In particular, the present invention relates to such a transparent roof module including solar cells.

2. Description of Related Art

Published German patent application DE 37 25 053 A1 discloses a motor vehicle glass roof with an outside first glass pane made from flint glass in which a smaller glass pane adapted to absorb part of the incident solar energy is provided in a first partial area above a viewing opening formed in the bottom of the solid roof skin in a sandwich-like construction, and is provided with solar cells in a second partial area on a bottom surface which is above a solid roof part. The disadvantage in the disclosed motor vehicle glass roof is the fact that the glass roof is expensive to fabricate and is very heavy.

Published German patent application DE 196 30 813 A1 discloses a pane structure which, for example, can be used for the cover of a sliding motor vehicle roof and consists of a composite of an outer larger glass pane and an underlying inner smaller glass pane. In the overlapping area between the panes, there is provided an electrochrome layer structure in order to control the transmission of the pane structure. The outer glass pane is coated before assembly with some of the electrochrome layer structure. In the edge area of the outer pane in which the panes do not overlap, the outer glass pane is provided with solar cells on the bottom surface. The disadvantage of this disclosed pane structure is that it is very expensive to fabricate.

Published German patent application DE 37 13 854 discloses a motor vehicle roof with a roof opening which can be closed by two movable covers in a fixed roof panel, the front cover which is made as a sliding and lifting cover consisting essentially of a pane of transparent material which is provided with solar cells in its edge area which is designed to prevent viewing of the cover mechanism from above. The central portion of a movable cover which allows viewing is provided with solar cells which are arranged in a lattice to reduce the incident solar radiation into the vehicle interior. The disclosed motor vehicle roof is also disadvantageous in that its fabrication is complicated.

SUMMARY OF THE INVENTION

One object of the present invention to provide a transparent roof module which allows efficient utilization of solar energy.

Another object of the present invention is to provide such a transparent roof module which provides a high level of comfort for the passengers.

Still another object of the present invention is to provide such a transparent roof module which minimizes weight.

Yet another object of the present invention is to provide such a transparent roof module which can be easily and economically produced.

In accordance with the preferred embodiments of the present invention, these objects and others are achieved by providing a transparent roof module for a motor vehicle roof where the transparent roof module includes a transparent pane for covering a roof opening, the cover including a nonviewing area and a viewing area through which objects are viewable through the cover, a transmission reducing layer provided on the viewing area of the transparent pane for reducing transmission of at least one of infrared and visible spectral range through the viewing area and solar cells provided at the nonviewing area of the transparent pane.

The transparent roof module in accordance with the present invention advantageously provides solar cells which are located only in areas of the transparent pane which cannot be used for viewing, i.e. the nonviewing areas which do not contribute to comfort with respect to light incidence. In addition, in the preferred embodiment of the present invention, the transparent roof module prevents excess light incidence and excess heating of the vehicle interior by infrared radiation while at the same time, incident solar radiation onto the solar cells is not reduced. In this regard, the transmission in the viewing area is reduced by applying of film and/or coating to the transparent pane. This allows the transparent roof module in accordance with the present invention to be easily and economically produced without significantly increasing the weight of the transparent roof module.

In one preferred embodiment of the present invention, solar cells are provided at all surface areas of the transparent pane which by virtue of the construction cannot be used to view objects beyond the transparent pane from the vehicle's interior, i.e., the nonviewing areas. In this regard, all other surface areas, i.e. the viewing areas, are provided with the transmission-reducing coating and/or film. This allows very efficient use of solar energy, especially when the pane is made of clear glass, while attaining maximum comfort for vehicle occupants and allowing easy manufacture of the transparent roof module.

In another preferred embodiment of the invention, the transmission reducing layer is made as black ceramic printing with spots or hole filters. This is an especially simple and economical approach for providing a transmission reducing layer.

Alternatively, the transmission reducing layer may a colored polycarbonate film which is laminated to a bottom surface of the transparent pane with adhesive film. This approach allows easy manufacturability and reduced weight.

The transmission reducing layer can also be a metal oxide coating which is applied to the bottom surface of the transparent pane. This approach also allows easy manufacturability and extremely low weight. This approach further minimizes any visible transitions of the transparent plane.

In addition, a colored transparent polycarbonate film may also be laminated onto the metal oxide coating by an adhesive film. In this way, transmission properties are achieved in a similar manner to colored glasses and the coating is protected from corrosion.

Furthermore, the transmission reducing layer may also be a dark tail film which is coated to be scratch-resistant and is cemented directly to a bottom surface of the transparent pane with acrylate cement. This approach is particularly advantageous in that it is substantially scratch proof.

These and other objects, features and advantages of the present invention will become more apparent from the following detailed description of the preferred embodiments of the invention when viewed in conjunction with the accompanying drawings.

DETAILED DESCRIPTION OF THE PREFERRED EMBODIMENT

Figure 1:
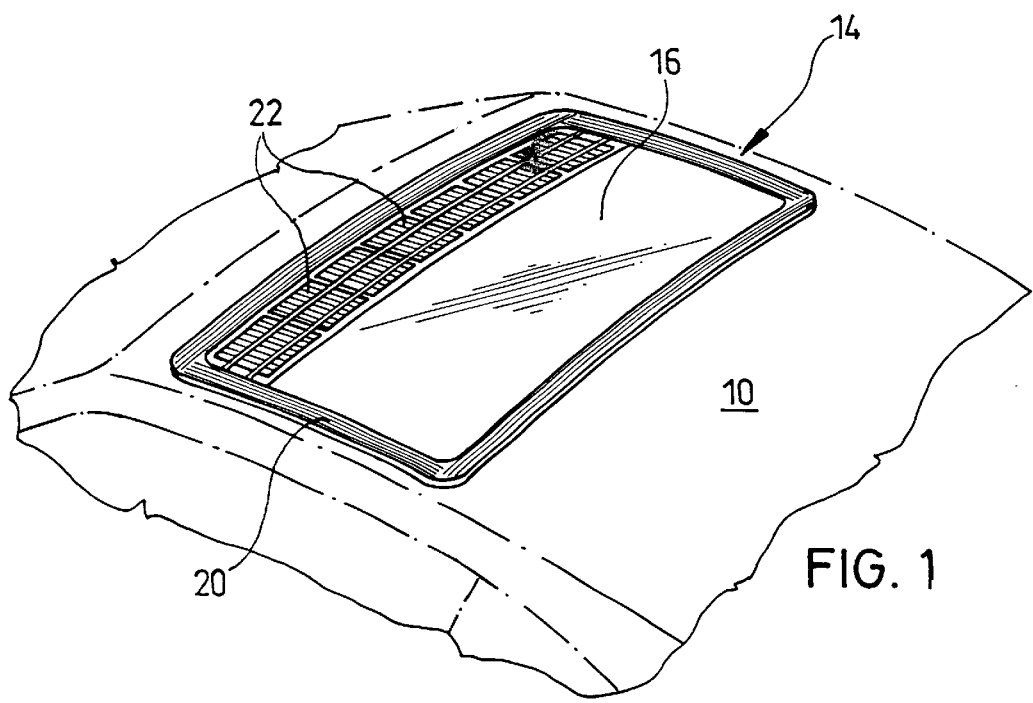
FIG. 1 shows a perspective view of a transparent roof module in accordance with one embodiment of the present invention.
Figure 2:
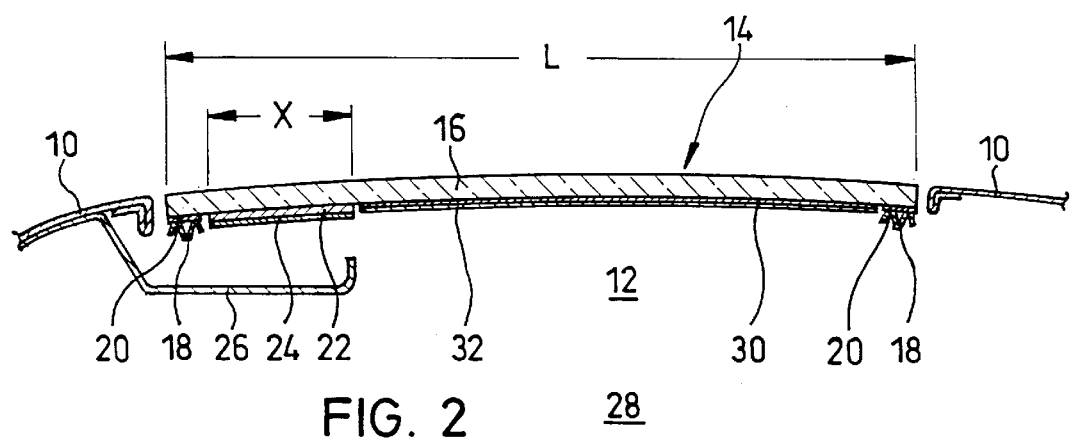
FIG. 2 shows a lengthwise cross-sectional view of the transparent roof module of FIG. 1.

FIGS. 1 and 2 illustrate a motor vehicle roof in accordance with one embodiment of the present invention. As will be discussed in further detail hereinbelow, the transparent roof module 14 in accordance with the present invention advantageously provides solar cells 22 which are located only in areas of the transparent pane 16 which cannot be used for viewing, i.e., the nonviewing areas which do not contribute to comfort with respect to light incidence. In addition, as will be explained in detail below, in the preferred embodiment, the transparent roof module 14 prevents excess light incidence and excess heating of the vehicle interior by infrared radiation while at the same time, incident solar radiation onto the solar cells is not reduced. In this regard, the transmission in the viewing area is reduced by applying of film and/or coating to the transparent pane 16. This allows the transparent roof module in accordance with the present invention to be easily and economically produced without significantly increasing the weight of the transparent roof module.

As can be clearly seen in FIGS. 1 and 2, a fixed motor vehicle roof 10 is provided with a roof opening 12 which may be selectively closed, fully cleared, or partially cleared by a transparent roof module 14, the transparent roof module 14 being adapted to be pushed and/or raised in the conventional manner. The transparent roof module 14 includes a transparent pane 16 which, in the preferred embodiment, is made of clear glass. The edges of the transparent pane 16 is cemented to a reinforcing element 18 which is joined to the roof operating mechanism (not shown). To protect the cement connection against ultraviolet radiation, the transparent pane 16 is provided with protection layer 20 in the area of the cement connection. The protection layer 20 may be a glass filter, for example. In its frontal area X, which in this embodiment is a nonviewing area of the transparent pane 16, the transparent pane 16 is laminated on its bottom surface with solar cells 22 which are backed with an opaque film 24. The frontal area X of the transparent roof module 14 which is provided with solar cells 22, may be between 10 to 30% of the length L with reference to the entire length L of the transparent roof module 14 in the direction of its travel. In the preferred embodiment, the frontal area X may be roughly 20%. In the closed position of the transparent roof module 14, the solar cells 22 lie above a roof area 26 which comprises fastening, drive or other elements of the roof mechanism (not shown). As can be appreciated, the roof area 26 obstructs the view so that it is not possible to look from the vehicle interior 28 to the outside in this area of the motor vehicle roof 10 and accordingly, does not allow light incidence to the inside by virtue of its construction, i.e. by virtue of the structure of the motor vehicle roof 10. Thus, in the preferred embodiment, the solar cells 22 are provided in this manner in a nonviewing area of the transparent pane 16. Of course, it should be noted that whereas the nonviewing area is provided in a frontal area of the transparent pane 16 in the illustrated embodiment, it may also be provided in alternative or various locations including a rear and/or side areas of the transparent panel6.

Figure 3:
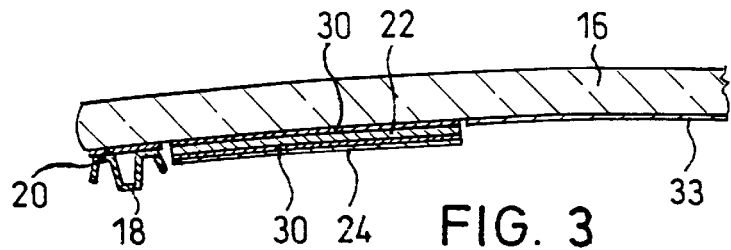
FIG. 3 shows a partial lengthwise cross-sectional view of a front area of a transparent roof module in accordance with another embodiment of the present invention including a metal oxide coating.

The area of the transparent roof module 14 which, in the closed position, is located in the area of the roof opening 12 to allow unobstructed viewing to the outside from the vehicle interior 28 is the viewing area of the transparent pane 16. In the preferred embodiment, on the bottom surface of the viewing area, the transparent pane 16 is laminated using an adhesive film 30 with a film 32 which reduces transmission in the visible range and in the infrared range in order to provide pleasant brightness in the vehicle interior 28 while at the same time, preventing excess heating of the vehicle interior 28 by the incident sunlight. The film 32 can be a colored transparent polycarbonate film. Furthermore, the pane 16 may also be a coated with a metal oxide before applying the polycarbonate film. Alternatively, instead of the polycarbonate film, a dark tail film can be used which is coated to be scratch proof and which is cemented directly onto the pane 16 by means of applied acrylate cement. Of course, it should also be appreciated that the film 32 need not be provided at all. In such a case, the transparent pane 16 may instead, be provided with a suitable transmission-reducing coating 33 (FIG. 3). Such a coating 33 may be a metal oxide applied to the bottom surface of the transparent pane 16. For instance, the coating 33 may be titanium oxide applied using a Sekurit® brand pane. Alternatively, the transparent pane 16 may be a Pilkington® brand transparent pane and can be coated with a Sigla® brand chromium or palladium coating. Furthermore, in yet another alternative embodiment, the transparent pane 16 can be provided with black ceramic printing with spots or hole filters.

Instead of forming a movable cover of an openable motor vehicle roof, the roof module in accordance with the present invention can also be used for transparent vehicle roofs which do not open.

While various embodiments in accordance with the present invention have been shown and described, it is understood that the invention is not limited thereto. These embodiments may be changed, modified and further applied by those skilled in the art. Therefore, this invention is not limited to the details shown and described previously but also includes all such changes and modifications which are encompassed by the appended claims.

We claim:

1. Transparent roof module for a motor vehicle roof having a roof drive mechanism, said transparent roof module comprising:

a transparent pane of only clear glass for covering a roof opening, said pane including a nonviewing area through which viewing is obstructed by an underlying fixed roof area and a viewing area through which objects are viewable through said cover;

a single transmission reducing layer equally distributed over only said viewing area of said transparent pane for reducing transmission of both infrared and visible spectral range light through said viewing area while continuing to allow viewing through the viewing area of said pane in a manner providing brightness in the vehicle interior while at the same preventing heating of the vehicle by incident sunlight; and solar cells provided only at said nonviewing area of said transparent pane and being backed by an opaque film, said solar cells being positioned above said underlying fixed roof area in a closed position of the cover the solar cells terminating, in the vehicle longitudinal direction, substantially coextensively with an edge of the fixed roof area.

2. Transparent roof module of claim 1, wherein said transmission reducing layer is at least one of a transmission reducing coating and a transmission reducing film.

3. Transparent roof module of claim 2, wherein said transparent pane is movable to at least partially uncover the roof opening.

4. Transparent roof module of claim 3, wherein substantially all surface areas of said transparent pane except said viewing area is provided with solar cells.

5. Transparent roof module of claim 2, wherein said transmission reducing coating is a metal oxide coating which is applied to a bottom surface of said transparent pane.

6. Transparent roof module of claim 5, further comprising a colored transparent polycarbonate film which is laminated onto said metal oxide coating with an adhesive film.

7. Transparent roof module of claim 2, wherein said transmission reducing film is a dark tail film which is coated to be scratch-resistant and is cemented directly to a bottom surface of said transparent pane with acrylate cement.

8. Transparent roof module of claim 1, wherein said clear glass pane is a single pane of safety glass which is coated with a hard coat layer.

9. Transparent roof module of claim 8, wherein said hard coat layer is one of titanium oxide and palladium.

10. Transparent roof module of claim 1, wherein said nonviewing area of said transparent pane is between 10 to 30% of a length of said transparent roof module.

11. Transparent roof module of claim 10, wherein said nonviewing area of said transparent pane is substantially 20% of the length of said transparent roof module.

12. Transparent roof module according to claim 1, further comprising a reinforcing element for connection of the transparent pane to a roof operating mechanism, said reinforcing element is joined to edges of the transparent pane by a cement connection, and wherein the transparent pane is provided with protection layer in the area of the cement connection to protect the cement connection against ultraviolet radiation.

* * * * *